(12) United States Patent
Yamazaki et al.

(10) Patent No.: US 7,575,495 B2
(45) Date of Patent: Aug. 18, 2009

(54) LAMP AND METHOD AND APPARATUS FOR FABRICATING LAMP

(75) Inventors: Kazuhiro Yamazaki, Shizuoka (JP); Fujihiko Sugiyama, Shizuoka (JP); Masahiro Enoki, Shizuoka (JP); Chiharu Matsunaga, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 498 days.

(21) Appl. No.: 11/081,013

(22) Filed: Mar. 15, 2005

(65) Prior Publication Data

US 2005/0225991 A1    Oct. 13, 2005

(30) Foreign Application Priority Data

Mar. 15, 2004    (JP)    ............ P. 2004-071869

(51) Int. Cl.
*H01J 9/00* (2006.01)
(52) U.S. Cl. .......................... 445/27; 445/23
(58) Field of Classification Search ............ 445/23, 445/25, 27
See application file for complete search history.

(56) References Cited

U.S. PATENT DOCUMENTS

| | | | |
|---|---|---|---|
| 6,464,374 B2 | 10/2002 | Akiyama et al. | |
| 6,465,757 B1 * | 10/2002 | Chen | 219/121.63 |
| 6,478,451 B2 | 11/2002 | Akiyama et al. | |
| 6,592,239 B1 * | 7/2003 | Akiyama et al. | 362/267 |

FOREIGN PATENT DOCUMENTS

CN    1266776 A    9/2000

(Continued)

OTHER PUBLICATIONS

Patent Abstracts of Japan, Publication No. 2001-243811 dated Sep. 7, 2001, 2 pages.

(Continued)

*Primary Examiner*—Peter Macchiarolo
(74) *Attorney, Agent, or Firm*—Osha • Liang LLP

(57) ABSTRACT

In a lamp including a lamp housing and a lamp cover, the lamp cover is laser-beam welded to an opening edge portion of the lamp housing. There exists no trace of fusion on the opening edge portion of the lamp housing in any other areas than a surfaces abutment portion where the lamp cover is brought into abutment. A method for fabricating a lamp includes bringing a lamp cover into abutment with an opening edge portion of a lamp housing; and emitting a laser beam to a surfaces abutment portion of the lamp housing with the lamp cover so as to laser-beam weld the lamp housing and the lamp cover together. The emission of the laser beam is implemented while blocking the laser beam so that the laser beam is not emitted to at least any other areas of the opening edge portion than the surfaces abutment portion. An apparatus for fabricating a lamp includes support means for rotatably supporting a lamp housing and a lamp cover that is brought into abutment with an opening edge portion of the lamp housing in an abutment state; laser beam emitting means for emitting a laser beam to a surfaces abutment portion of the opening edge portion where the lamp housing is in abutment with the lamp cover; and laser beam blocking means for blocking the emission of a laser beam to at least any other areas of the opening edge portion than the surfaces abutment portion.

4 Claims, 10 Drawing Sheets

FOREIGN PATENT DOCUMENTS

| | | |
|---|---|---|
| CN | 1311412 A | 9/2001 |
| CN | 1320787 A | 11/2001 |
| JP | 2001-243811 | 9/2001 |
| JP | 2003-123512 A | 4/2003 |
| JP | 2004-063332 A | 2/2004 |

OTHER PUBLICATIONS

Chinese Office Action issued in Chinese Application No. 2005100558339 mailed Mar. 21, 2008 and English translation thereof, 12 pages.

English Abstract of JP2004063332 published Feb. 26, 2004, esp@cenet database, 1 page.

English Abstract of JP2003123512 published Apr. 25, 2003, esp@cenet database, 1 page.

Notice of Reason of Rejection issued in Japanese Application No. 2004-071869 dated Sep. 18, 2008 and English translation thereof, 5 pages.

* cited by examiner

LAMP AND METHOD AND APPARATUS FOR FABRICATING LAMP

The present application claims foreign priority based on Japanese Patent Application No. P.2004-071869, filed Mar. 15, 2004, the contents of which are incorporated herein by reference.

BACKGROUND OF THE INVENTION

1. Field of the Invention

The present invention relates to a lamp suitable for the application to lamp of vehicles such as automobiles, and more particularly to a lamp in which a lamp cover is laser-beam welded to a lamp housing and a method and apparatus for fabricating the lamp.

2. Related Art

As lamps for vehicles, there have been widely proposed lamps in which a lamp body, as a lamp housing, and a lens, as a lamp cover for covering a front opening in the lamp housing so as to seal the interior of the lamp body, are separately produced from resin. Then, the lens is welded integrally to the lamp body. Conventionally thermal welding has been used in welding. These components together. In recent years, a so-called laser-beam welding technique has been put into practical use in which resin materials are fusion welded together by making use of laser beam energy. FIG. 1 is an exploded perspective view of an example of a lamp which is fabricated by means of the laser-beam welding, in which a flange portion 11 is formed around a front opening in a lamp body 1, and a lens leg portion 21 provided around a circumferential edge of a lens 2 is laser-beam welded to the flange portion 11.

FIG. 2A is a partially-cutaway front view of the lamp LAMP, and FIG. 2B is an enlarged view of a portion P of the lamp shown in FIG. 1, in which abutment surfaces of the flange portion 11 and the lens leg portion 21 are made integral with each other via laser-beam welding X. As shown in a conceptual drawing of FIG. 8A, the lens leg portion 21 around the circumferential edge of the lens 21 made of a transparent resin which is placed over the front opening in the lamp body 1 made of a chromatic colored resin is brought into abutment with the flange portion 11 provided around the lamp body 1 at an end face thereof, and a laser beam LB is transmitted through the lens 2 so as to be emitted to a surfaces abutment portion S made up of the abutment surfaces of the two components. The flange portion 11 of the lamp body 1 is heated through the emission of the laser beam LB. The heat generated is transmitted to the lens leg portion 21 via the surfaces abutment portion S, whereby the flange portion 11 and the lens leg portion 21 are each fused at the surfaces abutment portion S, so that both the flange portion 11 and the lens leg portion 21 are joined together through the laser-beam welding X. This laser-beam welding technique is described in, for example, JP-A-2001-243811.

In this type of lamp, normally, the flange portion is formed in a larger size than that of the lens leg portion because in the event that a circumferential surface of the lens protrudes outwardly of the lamp body when the lens is fusion welded to the lamp body, the lens tends to easily chip at the end face thereof and the external appearance of the lamp is damaged, which is not preferable. Due to this, as shown in FIG. 8B, when the lens leg portion 21 is brought into abutment with the flange portion 11, part of the flange portion 11 is exposed outwardly from the lens leg portion 21. When the laser beam LB is emitted to the surfaces abutment portion S of the flange portion 11 and the lens leg portion 21, there may be a chance that part of the laser beam LB is emitted to the exposed portion S' of the flange portion 11, which is not in abutment with the lens leg portion 21. In this exposed portion S', it is difficult for the heat generated in the flange portion 11 to be transmitted to the lens leg portion 21. Due to this, heat is accumulated in the exposed portion S' of the flange portion 11 to thereby produce an excessively heated state, whereby the surface of the exposed portion S' gets burned to produce a burn Y thereon. This causes problems in that the quality of the texture of the resin on the surface of the flange portion 11 is modified due to the burn Y. Thus, the welding strength to the lens leg portion 21 is affected and thereby decreased. Also, the black burn Y is exposed on the flange portion 11 of the chromatic colored lamp body to thereby damage the external appearance of the lamp LAMP.

To cope with these problems, it has been attempted to control the converging conditions of the laser beam and the position of the optical axis thereof may be controlled such that no laser beam is emitted to the exposed portion on the surface of the flange portion when emitting the laser beam. However, due to the beam diameter of the laser beam being small and the light emitted to the lens leg portion from the outside being refracted and scattering within the lens leg portion before it is emitted to the flange portion, it is extremely difficult to control the emitting range of the laser beam with high accuracy, and it is nearly impossible to solve the above problems. In addition, even in the event that accuracy at which the laser beam is emitted to a required position is increased, since it is difficult to avoid a variation in assembling of lenses with bodies during mass production, it is difficult to prevent the emission of the laser beam to the exposed portion on the surface of the flange portion. For example, FIG. 9A shows that the flange portion 11 is made identical to the lens leg portion 21 in size. However, when the laser beam LB is emitted to a portion where the circumferential end surface of the flange portion 11 is exposed, a burn Y is produced thereon. In addition, as shown in FIG. 9B, even in the event that the radial length of the flange portion 11 is shorter than that of the lens leg portion 21 and hence the circumferential end surface of the flange portion 11 resides radially inwardly of the circumferential surface of the lens leg portion 21, burns Y are produced on the circumferential end surface and other locations on the lamp body to which the laser beam is emitted.

SUMMARY OF THE INVENTION

In accordance with one or more embodiments of the present invention, a lamp comprises a lamp housing; and a lamp cover that is laser-beam welded to an opening edge portion of the lamp housing, wherein there exists no trace of fusion on the opening edge portion of the lamp housing in any other areas than a surfaces abutment portion where the lamp cover is brought into abutment.

In accordance with one or more embodiments of the present invention, a method for fabricating a lamp comprises bringing a lamp cover into abutment with an opening edge portion of a lamp housing; and emitting a laser beam to a surfaces abutment portion of the lamp housing with the lamp cover so as to laser-beam weld the lamp housing and the lamp cover together, wherein the emission of the laser beam is blocked so that the laser beam is not emitted to at least any other areas of the opening edge portion than the surfaces abutment portion.

In accordance with one or more embodiments of the present invention, an apparatus for fabricating a lamp comprises support means for rotatably supporting a lamp housing and a lamp cover that is brought into abutment with an opening edge portion of the lamp housing; laser beam emitting means for emitting a laser beam to a surfaces abutment portion of the opening edge portion where the lamp housing is in abutment with the lamp cover; and laser beam blocking means for blocking the emission of a laser beam to at least any other areas of the opening edge portion than the surfaces abutment portion.

In accordance with one or more embodiments of the present invention, an apparatus for fabricating a lamp comprises a support jig, wherein the support jig rotatably supports a lamp housing and a lamp cover that is brought into abutment with an opening edge portion of the lamp housing; a laser beam emitting unit that emits a laser beam to a surfaces abutment portion of the opening edge portion where the lamp housing is in abutment with the lamp cover; and a laser beam blocking ring for blocking the emission of a laser beam to at least any other areas of the opening edge portion than the surfaces abutment portion.

Other aspects and advantages of the invention will be apparent from the following description and the appended claims.

<Reference Numerals and Characters>

1: lamp body; 2: lens; 11: flange portion; 21: lens leg portion; 100: laser-beam welding apparatus; 101: chamber; 200: support jig; 210: lower jig; 220: upper jig; 211: lower mold; 213: motor; 214: laser beam blocking ring; 216: positioning mechanism; 221: upper mold; 222: vertical plunger mechanism; 300: robot; 310: laser beam emitting unit; 320: laser beam source unit; S: surfaces abutment portion; X: laser-beam welded portion; Y: burn.

DESCRIPTION OF THE PREFERRED EMBODIMENTS

Figure 1:
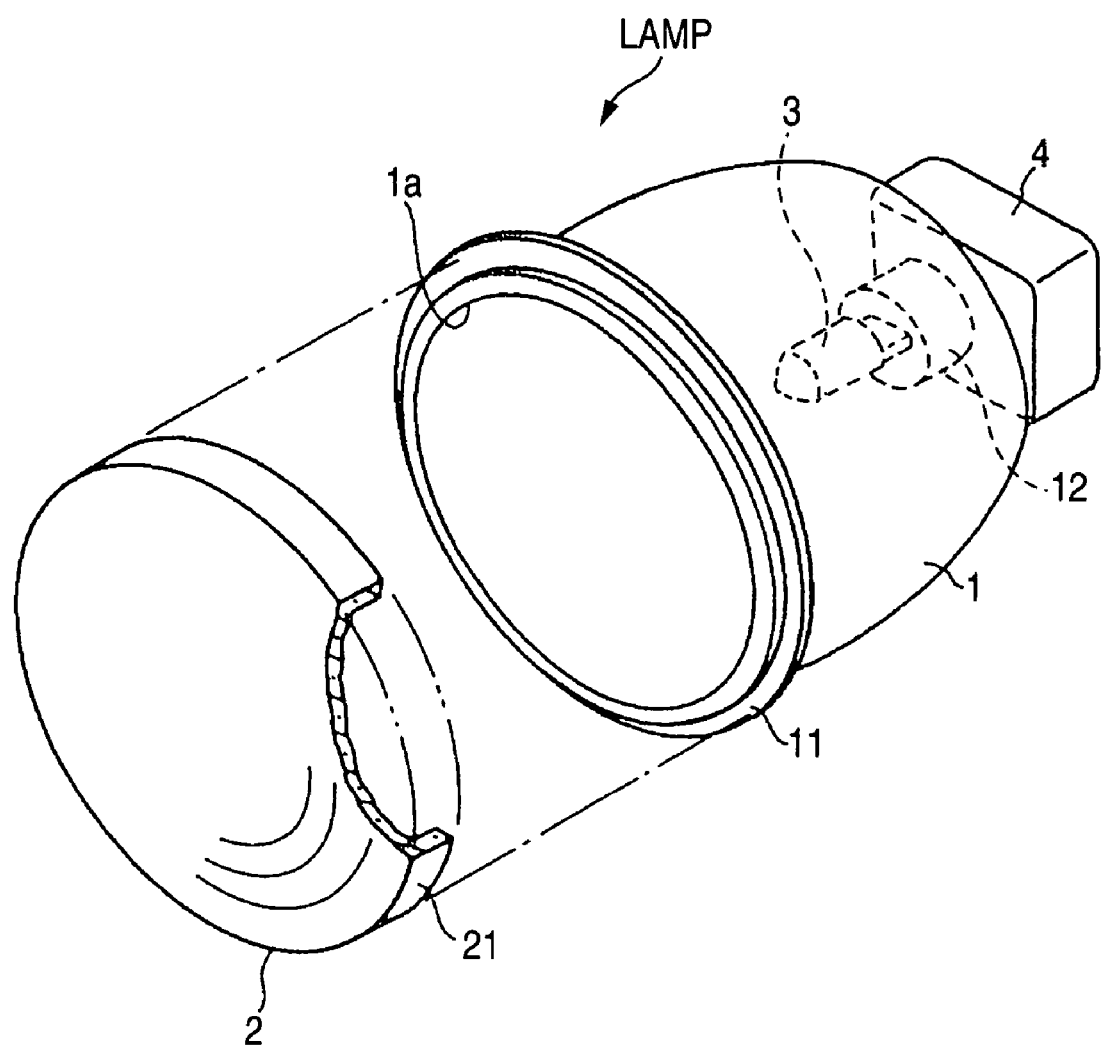
FIG. 1 is an exploded perspective view of a lamp according to an embodiment of the invention.
Figure 2A:
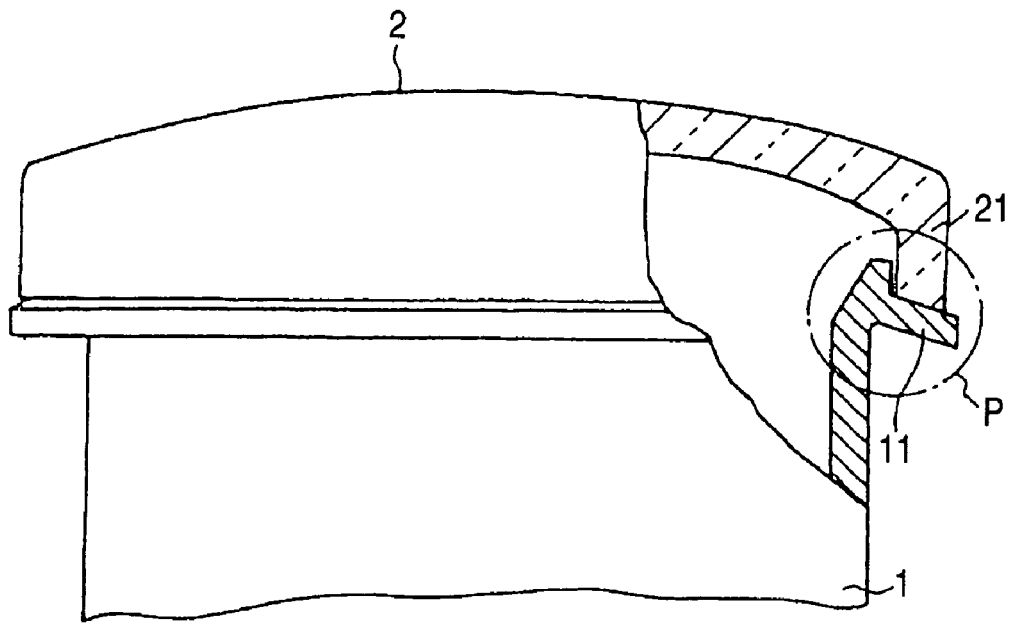
FIG. 2A is a partially cutaway front view of the lamp shown in FIG. 1.
Figure 2B:
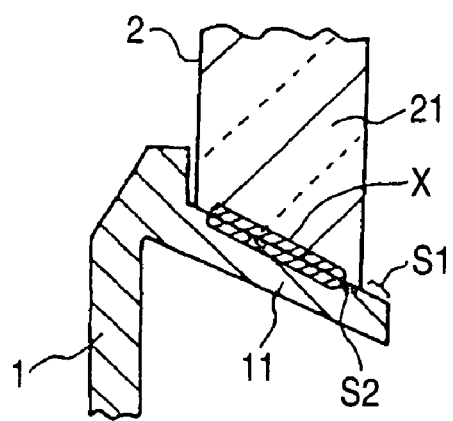
FIG. 2B is an enlarged view of the lamp shown in FIG. 2A.

Next, embodiments of the invention will be described with reference to the accompanying drawings. FIG. 1 shows, as has been described above, an automotive fog lamp to which a lamp LAMP according to an embodiment of the invention is applied. In addition, FIG. 2A is, as has been described above, a partially cutaway front view showing a main part thereof. A lamp body 1, which functions as a lamp housing, is formed into a container-like shape a back side portion of which is made into a paraboloid of revolution through resin molding, and an aluminum deposition, which is not shown, is applied to an internal surface of the lamp body so as to form a reflecting surface. In addition, a flange portion 11 is integrally formed along a circumferential edge of a front opening 1a in the lamp body 1 in such a manner as to protrude radially outwardly, and a bulb socket mounting hole 12 is opened in a back side of the lamp body 1, so that a bulb socket 4, which supports a bulb 3 therein, is mounted therein. A lens 2, which is molded of a transparent resin as a lens, is integrally secured to the front opening 1a in the lamp body 1 so as to seal the interior of the lamp body 1. A lens leg portion 21 made up of an annular rib is integrally formed on a circumferential edge of the lens 2, and an end face of the lens leg portion 21 is brought into abutment with the surface of the flange portion 11, whereby the lens leg portion 21 is, as shown in FIG. 2B, made integral with the flange portion 11 at the abutment portion through laser-beam welding X. Here, the flange portion 11 is formed so as to have a larger outside diameter than that of the lens leg portion 21 by a required magnitude, so that, when the lens leg portion 21 is brought into abutment with the flange portion 11, an external part of the surface of the flange portion 11 is exposed radially outwardly from the lens leg portion 21. Note that as has been described before, the laser-beam welding denotes a technique in which a laser beam is emitted to the surfaces abutment portion where the flange portion 11 is in abutment with the lens leg portion 21, so that the flange portion 11 and the lens leg portion 21 at the surfaces abutment portion are fused to be joined together by means of the energy of the laser beam.

In the fog lamp which is constructed as has been described above, as shown in FIG. 2B, no laser beam is emitted to the area S1 of the surface of the flange portion 11 which is exposed radially outwardly of the lens leg portion 21, and hence the relevant area is in a state where no trace of fusion of the flange portion 11 remains. Furthermore, in the case of FIG. 2B, no laser beam is also emitted to the surfaces abutment portion where the flange portion 11 abuts with the lens leg portion 21 in the area which extends along the outer circumference of the lens leg portion 21, and the relevant area is in a state where no trace of fusion of both the flange portion and the lens leg portion 21 remains or a state where no laser-beam welding is implemented.

Figure 3:
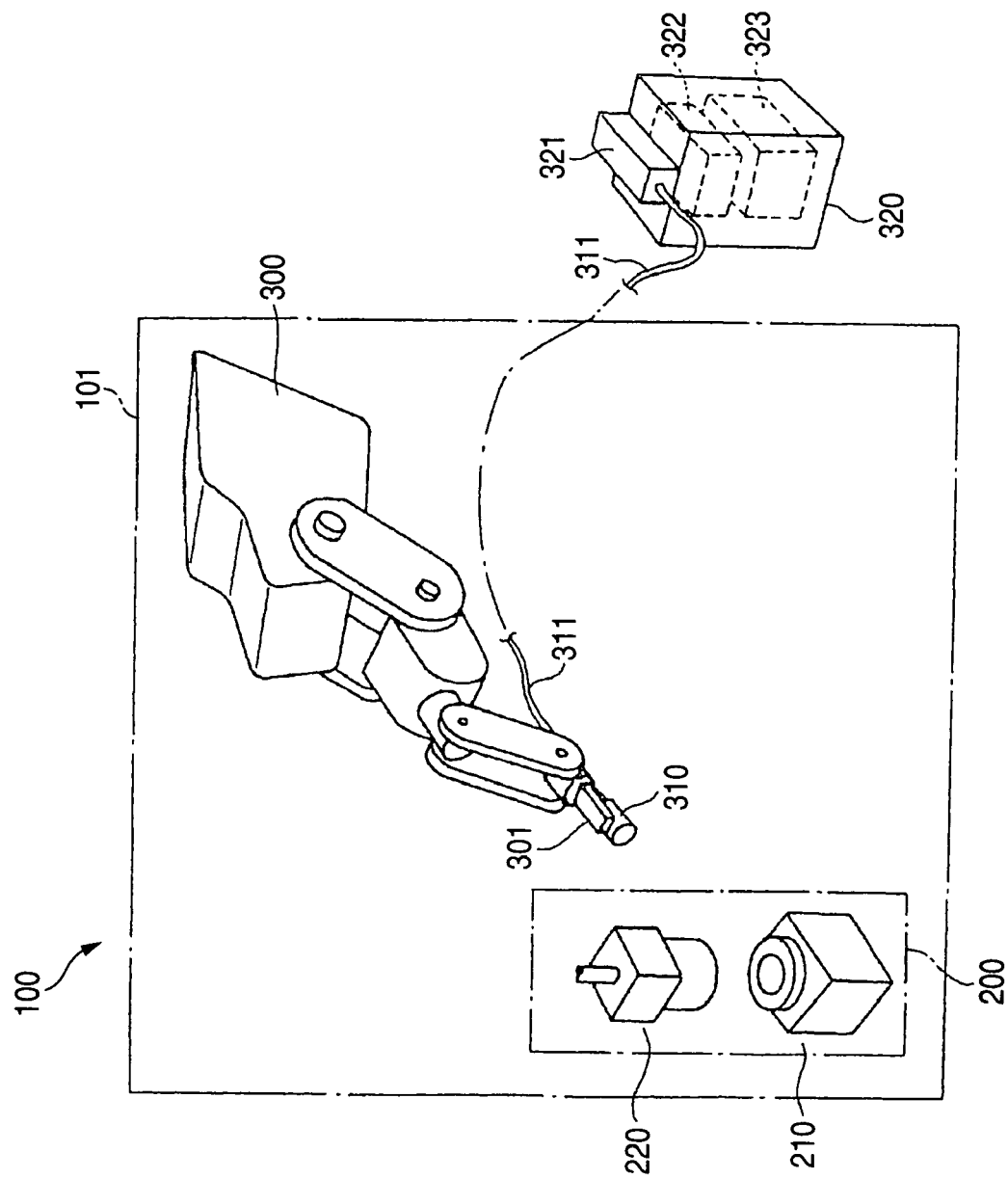
FIG. 3 is a perspective view illustrating a conceptual construction of a laser-beam welding apparatus according to an embodiment of the invention.

A technique for fabricating the fog lamp that is constructed as has been described above, or, in particular, a technique for laser-beam welding the lens to the lamp body will be described. FIG. 3 is a schematic perspective view of a laser-beam welding apparatus for laser-beam welding the lens leg portion to the flange portion of the lamp body of the fog lamp, as has been described before. A support jig 200 is disposed in the interior of a chamber 101 of a laser-beam welding apparatus 100, so that a laser-beam welding process can be implemented while left and right fog lamps are rotatably supported by the support jig 200 one by one. As will be described in details later, this support jig 200 is made up of an upper jig 210 and a lower jig 220, and the lamp body 1 of the fog lamp shown in FIG. 1 is rotatably supported on the lower jig 210 with the front opening thereof being oriented upwardly. In addition, the lens 2 is manually placed on the lamp body, that is rotatably supported, by the worker who is outside of the chamber, and the lens 2 is designed to be press supported on the lamp body 1 by means of the upper jig 220. Furthermore, a robot 300 is disposed at a position adjacent to the support jig 200 in the chamber 101, and a laser beam emitting unit 310 is disposed at a distal end of an arm 301 of the robot. This laser beam emitting unit 310 is optically connected to a laser beam source unit 320 disposed outside the chamber 101 via an optical fiber 311, so that a laser beam, which is emitted from the laser beam source unit 320 and is then guided through the optical fiber 311 to the laser beam emitting unit 310, can be emitted from a preset emitting direction to the fog lamp supported on the support jig 200. Note that the laser beam source unit 320 includes a semiconductor laser oscillator 321, a power control portion 322 for controlling power that is supplied to the semiconductor laser oscillator 321 and a water cooler 323 for cooling the semiconductor laser oscillator 321.

Figure 4:
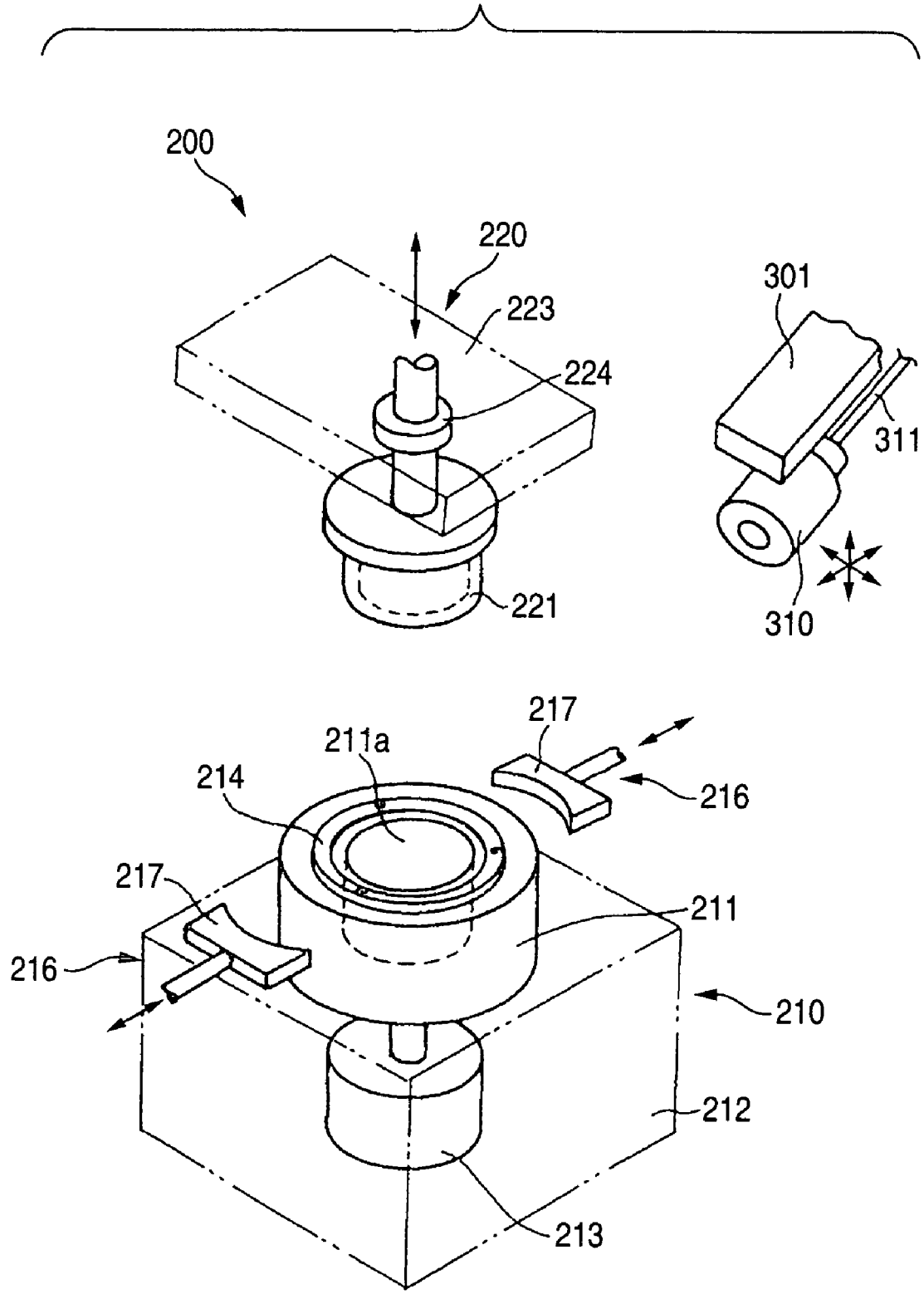
FIG. 4 is a schematic perspective view illustrating the construction of a support jig of the laser-beam welding apparatus.

FIG. 4 is a perspective view showing the support jig 200 conceptually. The lower jig 210 of the support jig 200 includes a lower mold 211 in an upper side of which an open recessed portion 211a is opened so as to rotatably support the lamp body 1 with the front opening 1a being oriented upwardly. This open recessed portion 211a is formed into a shape which can receive therein the back side of the lamp body land rotatably support the lamp body 1 in a state in which a back side of the flange portion 11 of the lamp body 1 is in abutment with the upper side of the lower mold 211. As will be described later on, the lamp body 1 can be rotatably supported within the open recessed portion 211a while maintaining a predetermined posture relative to the lower mold 211. The lower mold 211 is connected to a rotational shaft of a motor 213 provided within a lower frame 212 of the lower mold 211 as a rotational driving source, whereby the lower mold 211 is allowed to rotate at least once (360 degrees) in a horizontal direction by virtue of the rotation of the motor 213.

Figure 5:
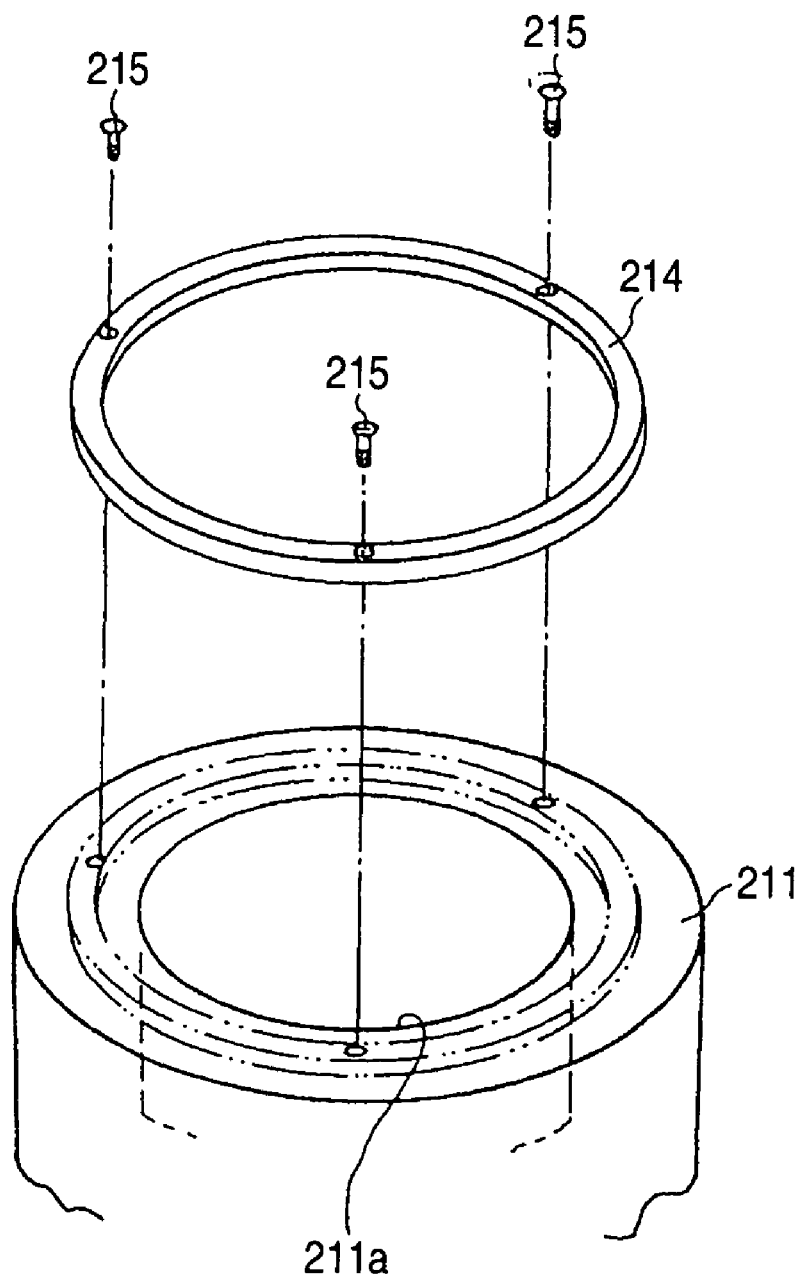
FIG. 5 is a schematic perspective view illustrating the construction of a lower mold of the support jig.

In addition, a laser beam blocking ring 214 is fixed to the upper side of the lower mold 211 along a circumferential edge of the open recessed portion 211a. The laser beam blocking ring 214 is formed into a ring having an inside diameter substantially equal to the outside diameter of the flange portion 11 around the front opening in the lamp body 1 and a required thickness and is, as shown in FIG. 5 in detail, fixed to the upper side of the lower mold 211 with a plurality of screws 215. The thickness of the laser beam blocking ring 214 is made slightly thicker than the thickness of the flange portion 11. Due to this, as will be described later on, when the lamp body 1 is rotatably supported in the lower mold 211, an upper edge of the laser beam blocking ring 214 is made to protrude slightly upwardly from an outer edge of the flange portion. In addition, the laser beam blocking ring 214 is formed of a black material having high light absorption effect, such as Alumite, so that even in the event that a laser beam is emitted, the reflection of the laser beam so emitted can be prevented.

Furthermore, as shown in FIG. 4, the lower jig 210 includes a pair of positioning jigs 216, and the jigs 216 are disposed at positions where the jigs 216 become flush with the upper side of the lower mold 211. The pair of jigs 216 includes a pair of presser pieces 217, and the presser pieces 217 are disposed on respective sides of the lower mold. The presser pieces 217 are machined such that sides thereof which face each other are formed into a shape similar to an arc-like shape. When the jigs 216 are moved in a central direction by means of driving mechanisms, not shown, respectively, the facing sides of the presser pieces 217 come into abutment with side edges of the lens 2, which rests on the lower mold 211 together with the lamp body 1, so as to press the lens 2 from both sides thereof in the central direction to thereby position the lens 2 relative to the lower mold 211. In other words, the lens 2 is positioned relative to the lamp body 1 which is rotatably supported in the lower mold 211.

The upper jig 220 of the support jig 200 has an upper mold 221 adapted to be reciprocated in a vertical direction relative to the lower mold 211 of the lower jig 210. A lower distal end face of the upper mold 221 is machined so as to provide a curved shape which follows a frontal shape of the lens 2 so as to come into abutment with a front side of the lens 2 to thereby press the lens 2 vertically downwardly. The upper mold 221 is reciprocated vertically by a driving mechanism, not shown, between a lower side position which is near the upper side of the lower mold 211 and an upper side position which can ensure a sufficient space which allows the lamp body 1 and the lens 2 to be properly set relative to the lower mold 211 and the fog lamp, to which a laser-beam welding has been duly applied, to be removed. In addition, the upper mold 221 is connected to a horizontally rotary bearing 224 which is provided on a movable stem 223 in such a manner as to rotate freely through 360 degrees in the horizontal direction and which is disposed coaxially with a rotational shaft of the motor 213 of the lower jig 210, so that the upper mold 221 can rotate horizontally together with the lower mold 211.

The robot 300 is made up of, for example, a 6-axis robot and can control the arm 301 in three-dimensional directions arbitrarily. In the robot 300, the arm 301 is program controlled in advance by a computer, not shown, so as to perform a required sequential operation in synchronism with the horizontal rotational operations of the lower mold 211 and the upper mold 221 of the support jig 200. The laser beam emitting unit 310 is, as shown in FIG. 3, optically connected to the laser beam source unit 320 disposed outside the chamber 101 via the optical fiber 311, so that the laser beam emitting unit 310 can emit a laser beam, which is emitted from the laser beam source unit 320 and is then guided to the laser beam emitting unit 310 via the optical fiber 311 in a converged state, to the surfaces abutment portion of the flange portion of the lamp body and the lens leg portion of the lens of the fog lamp.

Figure 6A:
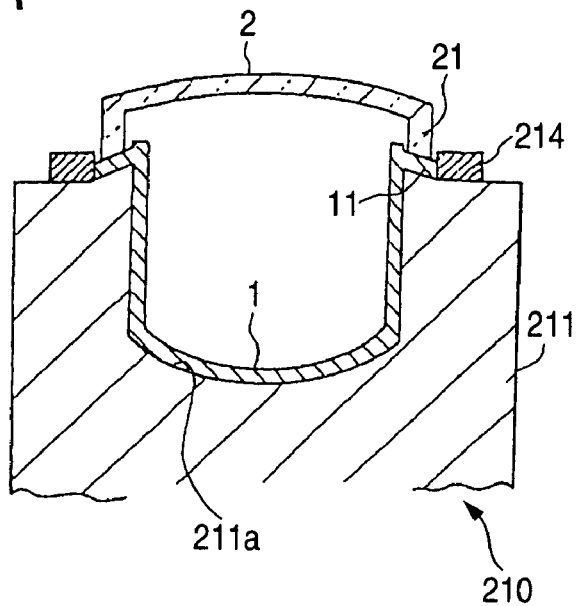
FIG. 6A is a process diagram which explains a first step of a laser-beam welding.

Next, a laser-beam welding method using the laser-beam welding apparatus 100 that has been described above will be described. First, the operator sets a lamp body in the lower jig 210 of the support jig 200. As shown in FIG. 6A, the back side of the lamp body 1 is inserted into the open recessed portion 211a in the lower mold 211 of the lower jig 210, whereby the lamp body 1 is rotatably supported within the open recessed portion 211a with the flange portion 11 being in abutment with the upper side of the lower mold 211 and the center of the lamp body 1 being aligned with the center of the lower mold 211. As this occurs, the perimeter of the flange portion 11 is surrounded by the laser beam blocking ring 214. Next, the operator places the lens 2 in such a manner as to cover the front opening 1a in the lamp body 1 which is rotatably supported in the lower mold 211, whereby the lens 2 is rotatably supported on the lamp body 1 in a state in which the end face of the lens leg portion 21 is in abutment with the surface of the flange portion 11.

Figure 6B:
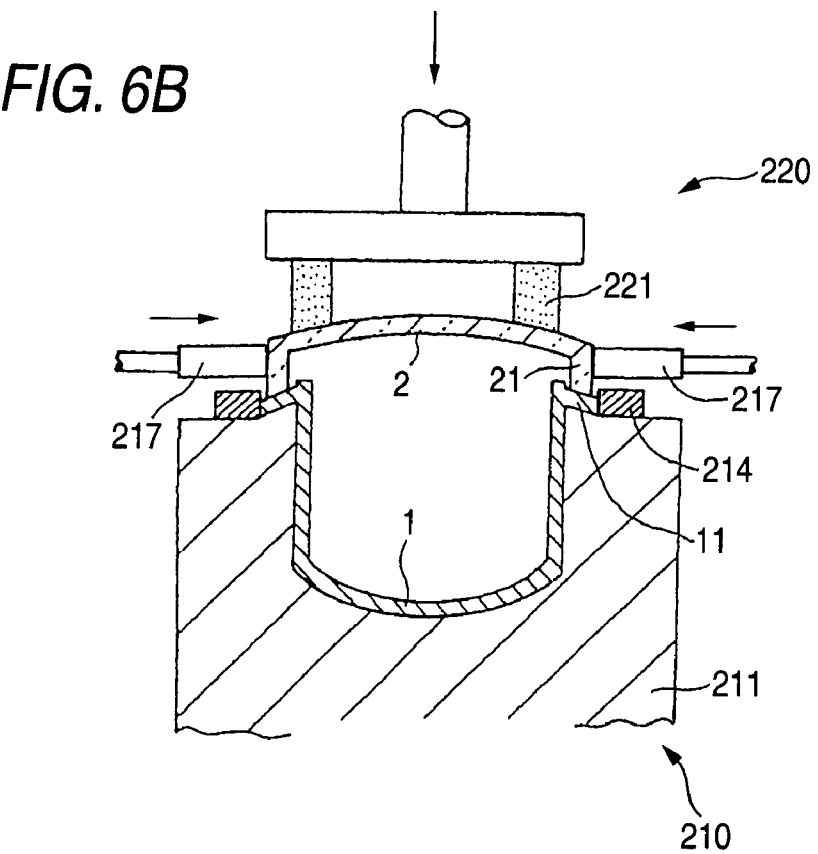
FIG. 6B is a process diagram which explains a second step of the laser-beam welding.

Then, as shown in FIG. 6B, when the pair of positioning jigs 216 is driven, the pair of presser pieces 217 is moved from the respective positions on the sides of the lens 2 towards the center of the lower mold 211 so as to be brought into abutment with the lens leg portion 21 on the circumferential edge portion of the lens 2 in a diametrical direction, whereby the lens 2 is held from the sides thereof. This allows the lens 2 to be positioned at the central position of the lower mold 211, and, as a result, the lens 2 is positioned relative to the lamp body 1.

Next, when the upper jig 220 of the support jig 200 is lowered by means of the driving mechanism, the upper mold 221 is lowered vertically, so that the lower distal end surface of the upper mold 221 is brought into abutment with a front side of the lens 2, whereby the lens 2 is pressed downwardly. This allows the end face of the lens leg portion 21 of the lens 2 to be brought into abutment with the surface of the flange portion 11 with a required pressing force, whereby the lens 2 and the lamp body 1 are put in an integral state. Consequently, even in the event that the holding of the lens 2 by the presser pieces 217 of the positioning jigs 216 is released, the abutment of the lens 2 with the lamp body 1 is held.

Figure 6C:
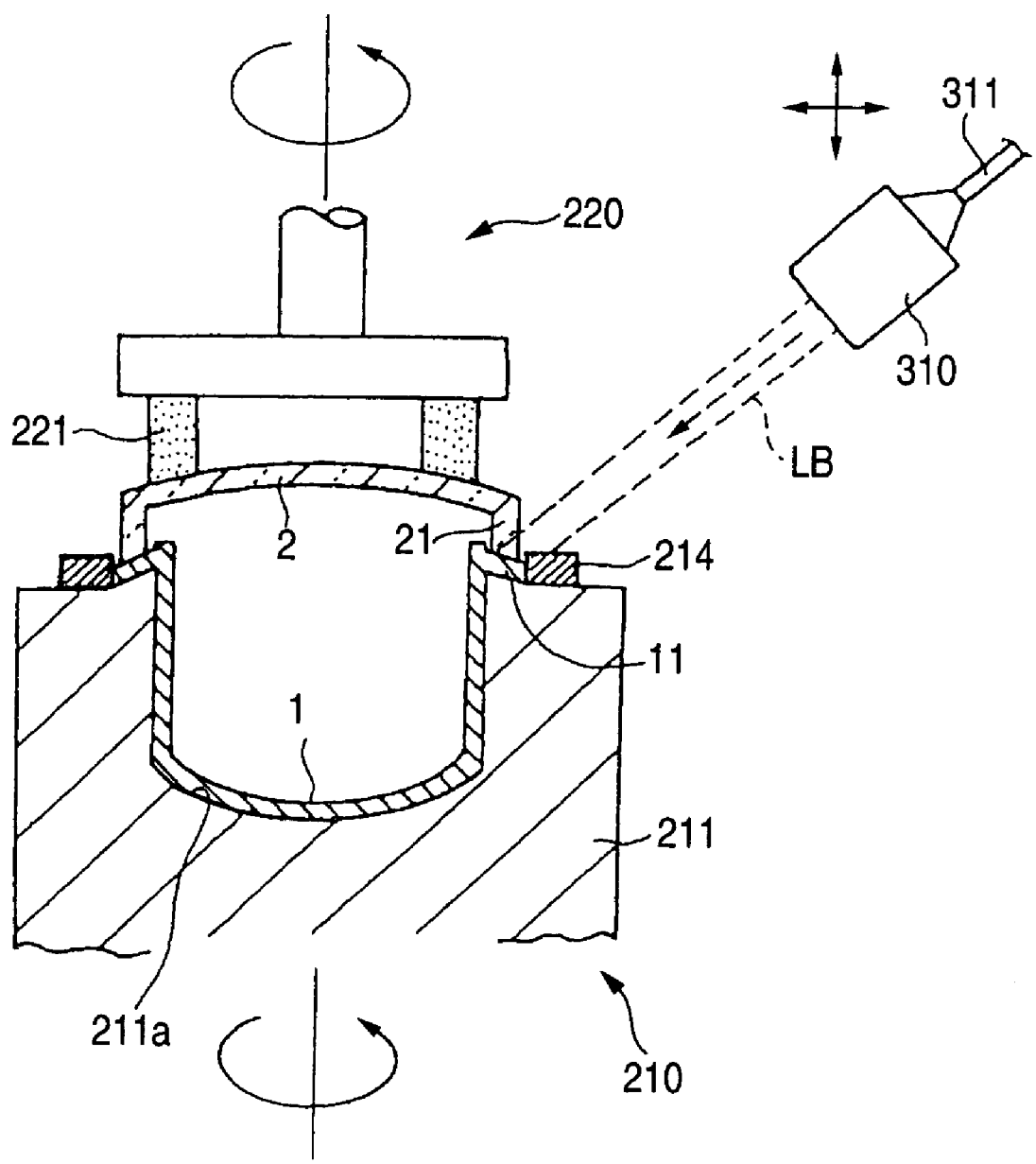
FIG. 6C is a process diagram which explains a third step of the laser-beam welding.

Then, as shown in FIG. 6C, the arm 301 of the robot 300 is activated so that the laser beam emitting unit 310 is disposed so as to face the support jig 200R, whereby the optical axis of a laser beam LB is set to be directed to the surfaces abutment portion of the flange portion 11 and the lens leg portion 21 from the external surface side of the lens leg portion 21 through the interior thereof. Then, as partially shown in FIG. 7A in an enlarged fashion, when a laser beam is emitted at the laser beam source unit 320 and is then emitted from the laser beam emitting unit 310 as a laser beam LB so as to be emitted to the surfaces abutment portion S of the flange portion 11 and the lens leg portion 21 in a converged state, the laser beam LB is absorbed at the flange portion 11 of the colored resin to thereby generate heat, whereby the surfaces abutment portion S of the flange portion 11 is fused. Part of the heat so generated is transmitted as far as the lens leg portion 21 via the surfaces abutment portion S to thereby fuse the surfaces abutment portion S of the lens leg portion 21, both the flange portion 11 and the lens leg portion 21 being fusion welded to thereby be fusion joined together.

In addition, at the same time, when the motor 213 in the lower jig 210 is driven to rotate the lower jig 211 in the horizontal direction and the arm 301 of the robot 300 is controlled sequentially so that the laser beam emitting unit 310 or the optical axis of the laser beam LB is controlled such that the direction and inclination thereof change to correspond to the shape of the front opening 1a in the lamp body 1 or the shape of the lens leg portion 21, the surfaces abutment portion S of the flange portion 11 and the lens leg portion 21 are irradiated around the full circumference thereof with the laser beam so that the flange portion 11 and the lens leg portion 21 are laser beam welded X together around the full circumference thereof. While the lower mold 211 is rotated through 360 degrees in the horizontal direction in conjunction with the horizontal rotation of the lamp body 1 and the lens 2, the emitting angle of the laser beam LB relative to the surfaces abutment portion of the flange portion 11 and the lens leg portion 21 being maintained constant.

Figure 7A:
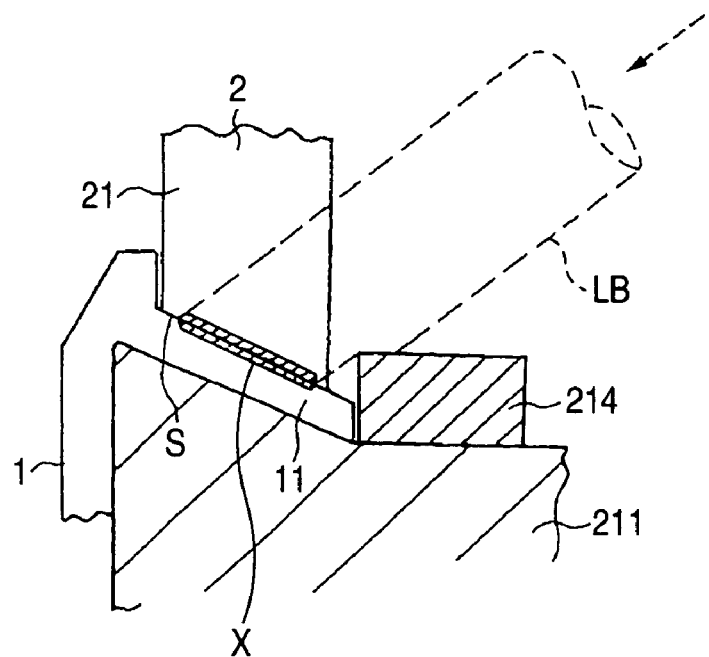
FIG. 7A is an enlarged view which explains a main part of the laser-beam welding.

As this occurs, as shown in FIG. 7A, while the laser beam LB that is emitted to the surfaces abutment portion S of the flange portion with the lens leg portion 21 is emitted from the outside of the lens leg portion 21, part of the laser beam LB is blocked by the laser beam blocking ring 214 which exists on the perimeter of the flange portion 11. In particular, because the laser beam in a lower area is blocked by the laser beam blocking ring 214, only the laser beam in an upper area of the laser beam LB is emitted to the lens leg portion 21. As a result, there is no risk that the laser beam LB directly irradiates the flange portion 11 on the area radially outwardly of the lens leg portion 21. Therefore, the aforesaid laser beam emission can be realized without controlling the optical axis position and optical axis direction of the laser beam with high accuracy due to the existence of the laser beam blocking ring 214. Accordingly, using the laser-beam welding construction as shown in FIG. 2B, a fog lamp can be fabricated in which there exists no trace of fusion of the flange portion in the area radially outwardly of the lens leg portion 21 where the flange portion 11 is exposed.

Figure 7B:
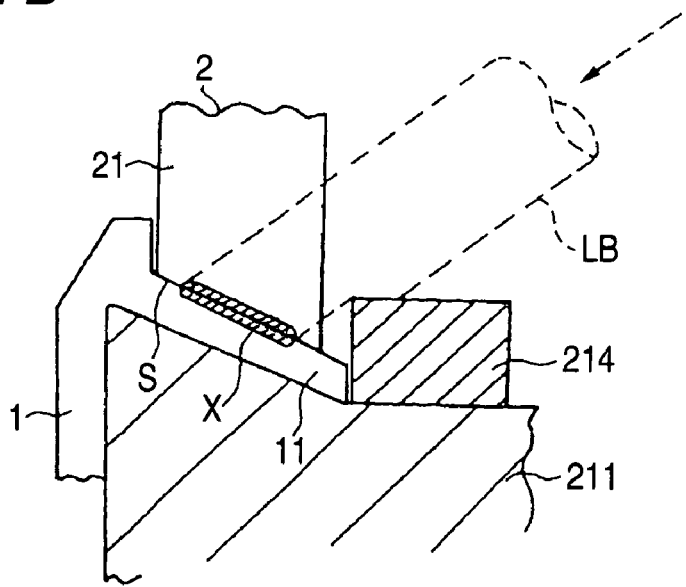
FIG. 7B is an enlarged view which explains a main part of the laser-beam welding.

In addition, different thicknesses of the laser beam blocking ring 214 may be used. As shown in FIG. 7B, selection of the thickness of the laser beam blocking ring 214 changes the area irradiated by the laser beam LB by appropriately controlling the optical axis angle and optical axis position of the laser beam LB that is emitted to the lens leg portion 21 so that a radially outward area of the surfaces abutment portion S of the flange portion 11 and the lens leg portion 21 is also not irradiated with the laser beam LB, a fog lamp can also be fabricated in which there exists no trace of fusion of both the flange portion and the lens leg portion 21 in the radially outward area of the surfaces abutment portion S which continues to the area radially outwardly of the surfaces abutment portion S. In other words, there exists no laser-beam welding of the flange portion 11 and the lens leg portion 21 in the area radially outwardly of the surfaces abutment portion S.

In addition, as a result of adopting the construction in which the radially outward side of the laser beam LB is blocked with the laser beam blocking ring 214, even in the event that the emission of the laser beam LB is deviated radially inwardly of the surfaces abutment portion S, the irradiation of an area inwardly of the flange portion 11 where there is no abutment with the lens leg portion 21 with the laser beam can be easily prevented by emitting the laser beam with the optical axis position of the laser beam LB being largely deviated radially outwardly relative to the surfaces abutment portion S. Thus, the occurrence of burning in a radially inward part of the flange portion can be prevented.

Figure 8A:
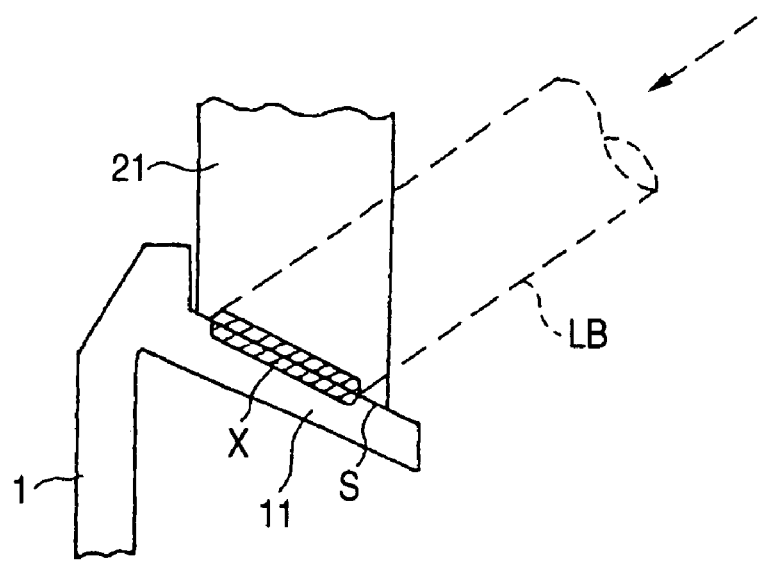
FIG. 8A and FIG. 8B are enlarged views which explain a first problem inherent in a conventional laser-beam welding.
Figure 8B:
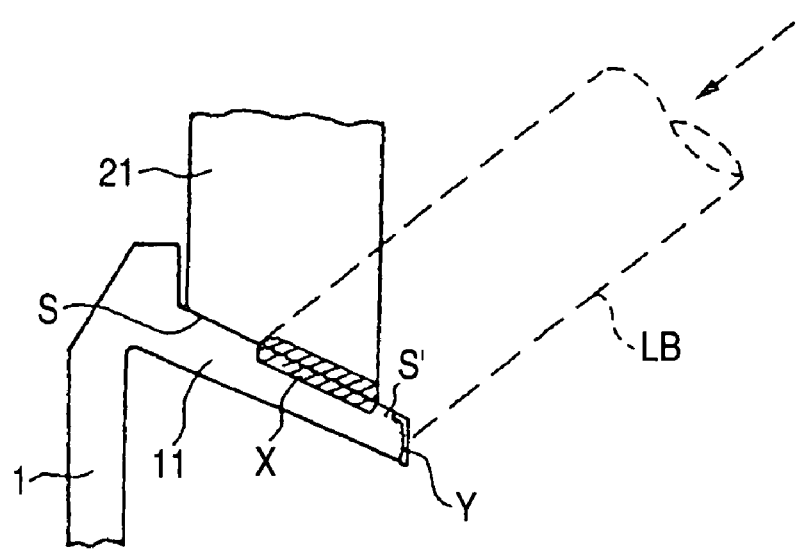
Figure 9A:
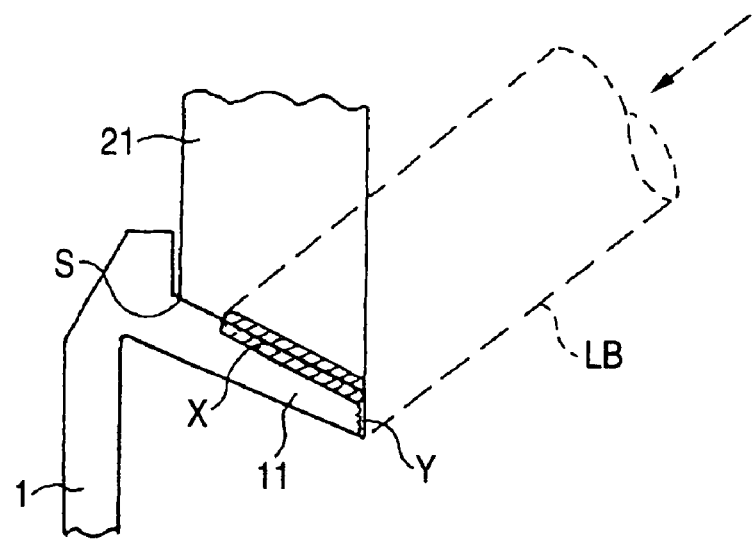
FIG. 9A and FIG. 9B are enlarged views which explain a second problem inherent in the conventional laser-beam welding.
Figure 9B:
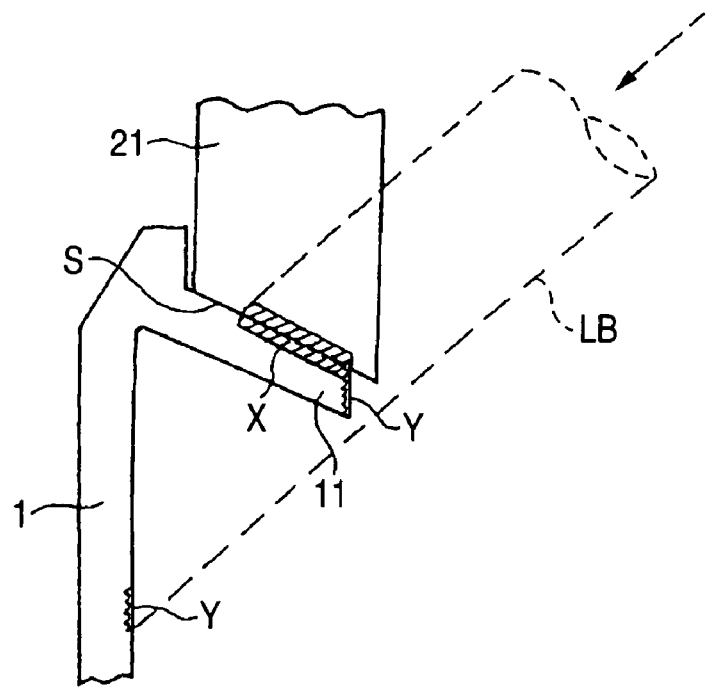

By fabricating the fog lamp in the manner described above, the conventional problem that the flange portion is excessively heated due to the heat generated in the flange portion not being transmitted to the lens leg portion can be prevented from occurring, thereby making it possible to prevent the occurrence of burning in the flange portion. Namely, not only can the occurrence of the burns Y shown in FIGS. 8A, 8B be prevented but also the occurrence of the burns Y shown in FIGS. 9A, 9B can be prevented, whereby the fog lamp can be fabricated which can not only enhance the laser-beam welding reliability but also prevent the deterioration of the external appearance thereof.

After the laser-beam welding to the fog lamp is completed, the rotation of the support jig 200 is stopped and the emission of laser beam is also stopped. Then, the jig 200 is raised by the driving mechanism, and the upper mold 221 is released from the press by the lens 2. As the fabricated fog lamp is exposed on the lower mold 211, the operator removes the fog lamp so fabricated from the lower mold 211, completing the whole process of the laser-beam welding.

While the embodiments described above have been applied to a fog lamp in which the lens leg portion of the lens is laser-beam welded to the flange portion provided on the lamp body, the invention can equally be applied to any lamp, provided that the lamp is such that a lamp cover made of a transparent material which has difficulty absorbing a laser beam is laser-beam welded to a lamp housing made of a material which easily absorbs a laser beam. For example, the invention can be applied to laser-beam welding of a lamp housing and a clear cover of a lamp in which a projector lamp is incorporated within the lamp housing and the clear cover is laser-beam welded to a front opening in the lamp housing.

Note that while the embodiments described above included the example in which the optical axis of the laser beam emitting unit is controlled so as to implement the laser-beam welding around the full circumference of the lamp while the lamp side or the lamp body and the lens are being rotated in the horizontal direction, the laser-beam welding may be implemented while the laser beam emitting unit is moved around the full circumference of the lamp with the lamp being made stationary, provided that the optical axis position of the laser beam emitting unit can be controlled. In this case, as well, advantages of the invention can be achieved without complicated control of the laser beam emitting unit.

In the embodiments, the invention provides a lamp which prevents the occurrence of burns on the lamp body or the lamp housing which is attributed to the laser-beam welding so as to prevent the reduction both in welding strength to the lamp cover such as the lens and external appearance of the lamp, and a method and apparatus for fabricating the lamp.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method for fabricating a lamp comprising:
   bringing a lamp cover into abutment with an opening edge portion of a lamp housing, wherein the lamp cover includes a lens leg portion and end face of the leg portion is brought into abutment with an opening edge portion;
   emitting a laser beam from an outer side surface of the lens leg portion though the lens leg portion to a surfaces abutment portion of the lamp housing with the lamp cover so as to laser-beam weld the lamp housing and the lamp cover together; and
   blocking the emission of the laser beam with a distinct blocking member separable from the lamp,
   wherein the emission of the laser beam is blocked so that the laser beam is not emitted to at least any other areas of the opening edge portion than the surfaces abutment portion.

2. The method of claim 1, wherein the distinct blocking member is a laser beam blocking ring,
   further comprising:
   disposing the laser beam blocking ring along an outer circumference of the opening edge portion, wherein the laser beam blocking ring blocks the laser beam so that the laser beam is not emitted to at least any other areas of the opening edge portion than the surfaces abutment portion.

3. The method of claim 1, further comprising:
   after the laser beam is emitted to the surfaces abutment portion of the lamp housing with the lamp cover, separating the lamp from the distinct blocking member.

4. The method of claim 2, further comprising:
   after the laser beam is emitted to the surfaces abutment portion of the lamp housing with the lamp cover, separating the lamp from the laser blocking ring.

* * * * *